(12) United States Patent
Bergström et al.

(10) Patent No.: US 8,798,102 B2
(45) Date of Patent: Aug. 5, 2014

(54) UPLINK SCHEDULING TIMING

(75) Inventors: Andreas Bergström, Vikingstad (SE); Martin Hessler, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 197 days.

(21) Appl. No.: 13/522,852

(22) PCT Filed: May 16, 2012

(86) PCT No.: PCT/SE2012/050538
§ 371 (c)(1),
(2), (4) Date: Jul. 18, 2012

(87) PCT Pub. No.: WO2013/172753
PCT Pub. Date: Nov. 21, 2013

(65) Prior Publication Data
US 2013/0308610 A1 Nov. 21, 2013

(51) Int. Cl.
*H04W 56/00* (2009.01)
*H04W 72/12* (2009.01)
(52) U.S. Cl.
CPC ................................... *H04W 56/00* (2013.01)
USPC ........................................................ 370/503
(58) Field of Classification Search
CPC .............................. H04W 56/00; H04W 72/12
USPC ........................................................ 370/503
See application file for complete search history.

(56) References Cited

U.S. PATENT DOCUMENTS 8,493,920 B2 * 7/2013 Park et al. .................... 370/329

FOREIGN PATENT DOCUMENTS

| WO | WO 2009116912 A1 * | 9/2009 |
| WO | 2011/090566 A1 | 8/2010 |
| WO | 2011/025426 A1 | 3/2011 |
| WO | WO2013172753 A1 * | 11/2013 |

* cited by examiner

*Primary Examiner* — Melvin Marcelo
(74) *Attorney, Agent, or Firm* — Murphy, Bilak & Homiller, PLLC

(57) ABSTRACT

A device (100) for scheduling uplink transmission comprises a timing estimator (110) configured to estimate the timing with which data packets are being available for uplink transmission in a User Equipment, UE, on the user side, and an uplink scheduler (120) configured to perform uplink scheduling in accordance with the estimated timing. The device further comprises a detector (130) configured to detect lost time alignment of UE data packet availability and allocated resources for uplink transmission based on reception of a predefined UE response on the uplink data channel. The device also comprises a determiner (140) configured to determine, in response to lost time alignment, an updated estimate of the timing with which data packets are being available for uplink transmission in the UE based on information representative of an alignment interval within which data packets are being available for uplink transmission in the UE after detection of lost time alignment. The uplink scheduler (120) is configured to perform uplink scheduling in accordance with the updated estimate of the timing to re-establish time alignment of UE data packet availability and allocated resources for uplink transmission.

27 Claims, 11 Drawing Sheets

UPLINK SCHEDULING TIMING

TECHNICAL FIELD

The present invention generally relates to wireless communication systems, and more particularly to a method and device for scheduling uplink transmission of data packets between a user side and a network side in a wireless communication network.

BACKGROUND

In wireless communication systems, the process of scheduling plays an important role for the overall performance. Scheduling is normally part of the general resource management, and typically involves allocating communication resources, such as the transmission resources of a shared radio medium, to users.

The scheduler is normally a key element to provide higher data rates, reduced latency and improved system capacity. There is thus a general demand for efficient scheduling in wireless communication systems, and especially in the radio access networks. Examples include radio access networks such as GSM EDGE Radio Access Network (GERAN), UMTS Terrestrial Radio Access Network (UTRAN) and Evolved UTRAN (E-UTRAN).

For example, in E-UTRAN, which forms part of the Long Term Evolution (LTE) system, the scheduler assigns radio resources, also called Resource Blocks, for the downlink as well as for the uplink using the Physical Downlink Control CHannel (PDCCH).

For the uplink, the scheduling may for example operate based on a request-grant principle, where a user terminal, or User Equipment (UE), 10 requests, by a scheduling request, permission to transmit data and a network node 20 handling the scheduling on the network side provides a grant for the uplink transmission, as schematically illustrated in FIG. 1. Other types of scheduling principles are also possible.

The network side normally needs information about the current state of the data packet buffers in the UEs.

In LTE, for example, this information can be sent from the UEs to the network side by means of a Scheduling Request (SR) and/or a Buffer Status Report (BSR). The Scheduling Requests are normally transmitted on a control channel such as the Physical Uplink Control CHannel (PUCCH), while the Buffer Status Reports are typically transmitted on the data channel such as the Physical Uplink Shared CHannel (PUSCH).

By way of example, in LTE, a UE may request uplink resources on PUSCH by sending a PUCCH format 1/1a/1b on its given SR resources, upon which the network will respond with an uplink grant indicating on which PUSCH resources the UE may transmit. Alternatively, if Semi Persistent Scheduling (SPS) is used, the uplink grant only needs to be sent once and is thereafter valid until SPS deactivation or reconfiguration.

The amount of data the UE has buffered, and hence needs to transmit on PUSCH, may be indicated via a subsequent BSR in the first PUSCH transmission. This information is however of no use for applications where packets are generated intermittently in the UE, such as e.g. for VoIP, where new speech frames are generated every 20 ms, and there will only occasionally be data packets in the buffer. This means that the network will not have any information of when the UE will need to transmit its next VoIP frame until it receives the very next SR. In this context, it should be kept in mind that the UE can only send a SR at those instances given by the scheduling request opportunities allocated to the UE by the network. This means that that there may be a considerable time delay until the network is actually informed about the need of the UE to transmit a packet.

The network generally needs to balance two different, and conflicting, requirements regarding the uplink scheduling:

In order to keep the delays as low as possible and/or to create extra delay slack for the benefit of Radio Resource Management (RRM) flexibility, the PUSCH transmission ought to take place as soon as possible after an application level packet (e.g. a VoIP frame) has been generated in the UE.

In order to optimize system efficiency, the network should avoid over-provisioning of PUSCH resources to one and the same UE. Otherwise this approach could be used to keep the delays low.

VoIP is not the only application that has such intermittent or periodic behavior. Other applications exhibiting this behavior include gaming applications. Games often use a periodic state update, for example, 50 states/second that can for example be in sync with the frame rate (frames/sec) of the game. In contrast to VoIP, games have a somewhat random behavior due to the fact that the application can experience situations where it can not maintain its target frames/sec resulting in a delay/offset in the periodic behavior.

Keeping the delays to a minimum whilst simultaneously also avoiding over-provisioning of PUSCH resources to a UE, would require a perfect "synchronization" between UE application layer packet generation and uplink transmission on PUSCH. In other words, it will require the network to be fully aware of exactly when in time the application level packets are generated and thereafter schedule the PUSCH accordingly.

UE application layer packet generation could experience jitter and delays that would offset static sync generation that assumes constant inter-arrival time. For example, games can have a fixed rate game engine running for example 50 states/second (i.e. frames per second) that generate packets with 20 ms periodicity, but can randomly stall when some process intensive action occurs in the game, thus losing synchronization. Games are also very latency sensitive.

A solution for games would be to give very short SR periodicity, i.e. 1 ms, on PUCCH, but this is not possible in practice due to the common situation of high number of users in connected mode. As an example 700 users in a cell would need close to 40% of the uplink for SR on a 10 MHz carrier with 1 ms periodicity. This is not acceptable in practice.

Hence there is still a general demand for solutions that can effectively handle the conflicting requirements of delay and over-provisioning with regard to uplink scheduling.

Reference [1] uses Radio Resource Control (RRC) reconfiguration giving short SR periodicity to probe synchronization, but would need RRC reconfiguration every time synchronization is lost.

Reference [2] relates to uplink delay scheduling, and more specifically the computation of a delay time parameter that can be used to make better scheduling decisions.

SUMMARY

It is a general object to provide an improved mechanism for scheduling uplink transmission of data packets.

In particular, it is desirable to find a solution for uplink scheduling that can effectively handle the conflicting requirements of delay and over-provisioning.

In a first aspect, there is provided a method for scheduling uplink transmission of data packets between a user side and a network side in a wireless communication network. The method is based on estimating, on the network side, the timing with which data packets are being available for uplink transmission in a User Equipment, UE, on the user side. The data packets are assumed to be generated periodically and available for uplink transmission with a given periodicity unless subjected to unexpected delay. The method further comprises performing, on the network side, uplink scheduling in accordance with the estimated timing to provide time alignment of UE data packet availability and allocated resources for uplink transmission. The proposed method involves detecting, on the network side, lost time alignment of UE data packet availability and allocated resources for uplink transmission based on reception of a predefined UE response on the uplink data channel that differs from the expected periodically generated data packets. The method comprises determining, on the network side and in response to lost time alignment, an updated estimate of the timing with which data packets are being available for uplink transmission in the UE based on information representative of an alignment interval within which data packets are being available for uplink transmission in the UE after detection of lost time alignment. The proposed method further involves performing, on the network side, uplink scheduling in accordance with the updated estimate of the timing with which data packets are being available for uplink transmission in the UE to re-establish time alignment of UE data packet availability and allocated resources for uplink transmission.

In this way, uplink transmission can generally take place as soon as possible after the data packets are generated and available for transmission. When the time alignment of UE data packet availability and allocated resources for uplink transmission is lost due to unexpected delays in the packet generation, this can be reliably and effectively detected. In response to lost alignment, an updated estimate of the timing with which data packets are being available for uplink transmission in the UE can be determined and time alignment of UE data packet availability and allocated resources for uplink transmission can quickly be re-established.

In a second aspect, there is provided a device for scheduling uplink transmission of data packets between a user side and a network side in a wireless communication network. The device comprises an estimator configured to estimate the timing with which data packets are being available for uplink transmission in a User Equipment, UE, on the user side. The data packets are assumed to be generated periodically and available for uplink transmission with a given periodicity unless subjected to unexpected delay. The device also comprises an uplink scheduler configured to perform uplink scheduling in accordance with the estimated timing to provide time alignment of UE data packet availability and allocated resources for uplink transmission. According to the proposed technology, the device further comprises a detector configured to detect lost time alignment of UE data packet availability and allocated resources for uplink transmission based on reception of a predefined UE response on the uplink data channel that differs from the expected periodically generated data packets. The device also comprises a determiner configured to determine, in response to lost time alignment, an updated estimate of the timing with which data packets are being available for uplink transmission in the UE based on information representative of an alignment interval within which data packets are being available for uplink transmission in the UE after detection of lost time alignment. Further, the uplink scheduler is configured to perform uplink scheduling in accordance with the updated estimate of the timing with which data packets are being available for uplink transmission in the UE to re-establish time alignment of UE data packet availability and allocated resources for uplink transmission.

In a third aspect, there is provided a network node comprising such a device.

In a fourth aspect, there is also provided a computer program for performing, when running on a computer system, the method for scheduling uplink transmission of data packets.

Other advantages will be appreciated when reading the detailed description.

BRIEF DESCRIPTION OF THE DRAWINGS

The proposed technology, together with further objects and advantages thereof, may best be understood by making reference to the following description taken together with the accompanying drawings, in which.

DETAILED DESCRIPTION

Throughout the drawings, the same reference numbers are used for similar or corresponding elements.

The uplink transmission should preferably take place as soon as possible after the data packets are generated and available for transmission. The proposed technology is based on providing time alignment of UE data packet availability and the allocated resources for uplink transmission, i.e. time aligning the data packet availability and the allocated resources that provide possibility or opportunity for uplink transmission. In this way, uplink transmission can take place as and when the data packets are available for transmission, or at least with minimal delay. The time alignment does not necessarily imply that the allocated uplink transmission resources coincide precisely in time with the availability of the data packets, but means that the uplink transmission resources are allocated in a given relative position to the timing when the data packets are expected to be available. For example, a small safety margin may be used to help ensure that the packets are indeed available for uplink transmission at the allocated uplink transmission opportunities. Depending on the implementation, including the type of wireless communication system and the technical configuration and settings of the system, there may also be an additional small delay between data packet availability and the allocated uplink transmission resources. However, it is desirable to keep the delays as small as possible within the context of the given system configuration.

Although there may be a small relative delay, the time alignment of UE data packet availability and the allocated resources for uplink transmission may be regarded, and is sometimes referred to, as a "synchronization" of the packet availability and the allocated uplink transmission resources.

Figure 1:
FIG. 1 is a schematic diagram illustrating an example of the signaling for uplink scheduling in a conventional wireless communication system.
Figure 2:
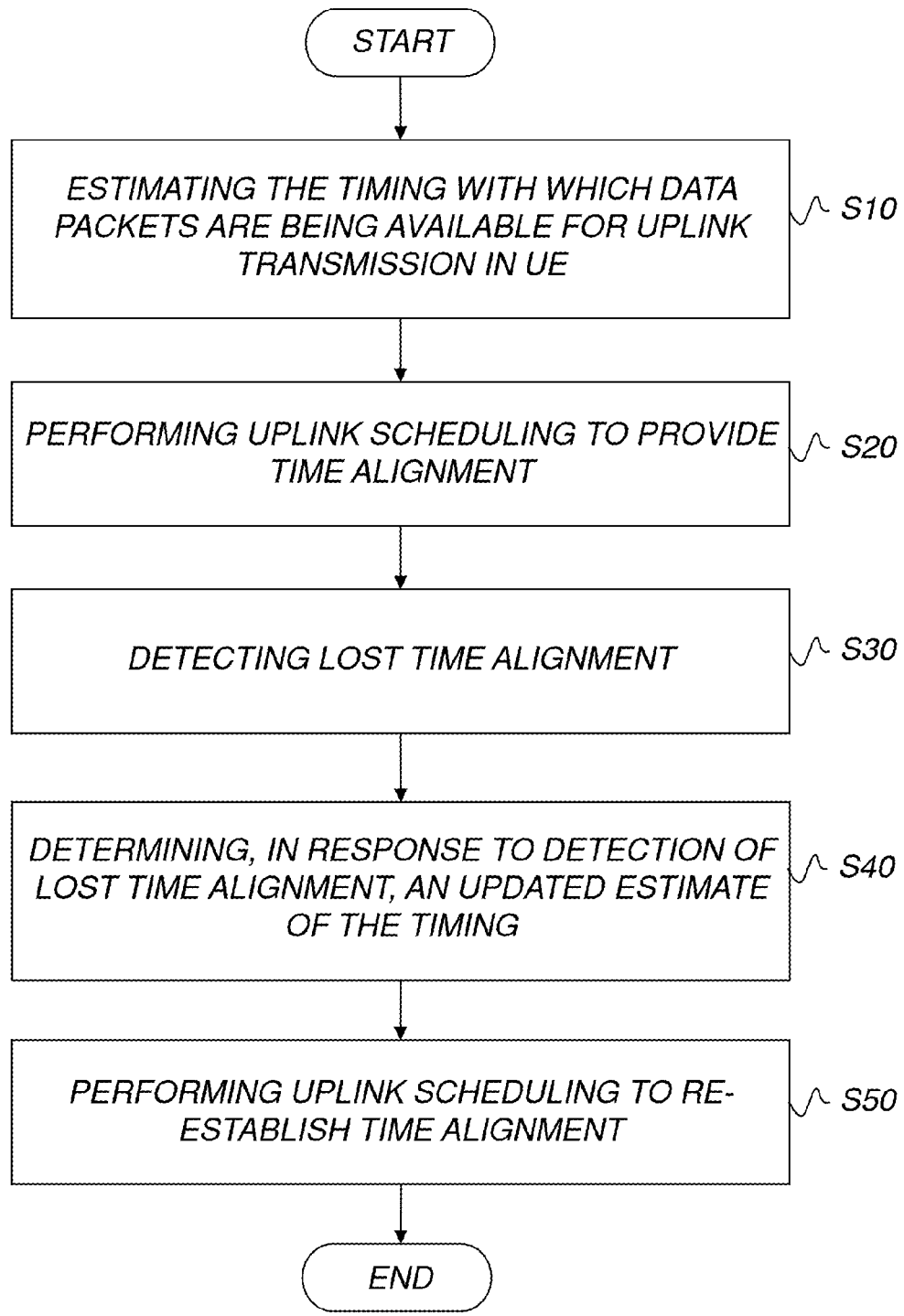
FIG. 2 is a schematic flow diagram illustrating an example of a method for scheduling uplink transmission according to an embodiment.

FIG. 2 is a schematic flow diagram illustrating an example of a method for scheduling uplink transmission according to an embodiment. In step S10, the method is estimating, on the network side, the timing with which data packets are being available for uplink transmission in a User Equipment, UE, on the user side. The data packets are assumed to be generated periodically and available for uplink transmission with a given periodicity unless subjected to unexpected delay. In step S20, the method is performing, on the network side, uplink scheduling in accordance with the estimated timing to provide time alignment of UE data packet availability and allocated resources for uplink transmission on the uplink data channel. In step S30, the proposed method involves detecting, on the network side, lost time alignment of UE data packet availability and allocated resources for uplink transmission based on reception of a predefined UE response on the uplink data channel that differs from the expected periodically generated data packets. In step S40, the method comprises determining, on the network side and in response to lost time alignment, an updated estimate of the timing with which data packets are being available for uplink transmission in the UE based on information representative of an alignment interval within which data packets are being available for uplink transmission in the UE after detection of lost time alignment. In step S50, the proposed method further involves performing, on the network side, uplink scheduling in accordance with the updated estimate of the timing with which data packets are being available for uplink transmission in the UE to re-establish time alignment of UE data packet availability and allocated resources for uplink transmission.

In this way, uplink transmission can generally take place as soon as possible after the data packets are generated and available for transmission. When the time alignment of UE data packet availability and allocated resources for uplink transmission is lost due to unexpected delays in the packet generation, this can be effectively detected. In response to lost alignment, an updated estimate of the timing with which data packets are being available for uplink transmission in the UE can be determined and time alignment of UE data packet availability and allocated resources for uplink transmission be quickly re-established. This will also result in improved overall system efficiency.

The proposed method is legacy compatible with existing UE implementations. It can also give low latency access to applications with periodic packet generation even in situations where the number of connected UEs in connected mode makes it unfeasible to provide short SR periodicity, and also even if there are random delays in the packet generation at the user side.

The proposed technology is generally applicable to wireless communication systems where shared radio transmission resources need to be scheduled and allocated to users. Examples include radio access networks such GERAN, UTRAN, E-UTRAN, as well as other 3GPP networks.

The proposed method is not limited to the scheduling request (SR) and grant principle commonly used in LTE, but can be used for any of principle of scheduling uplink transmission opportunities.

In other words, the technology proposed here is applicable to a wide variety of systems for wireless communications including GSM EDGE Radio Access Network/Enhanced General Packet Radio Service (GERAN/E-GPRS), High Speed Packet Access (HSPA) as well as LTE systems.

In the particular example of LTE, the uplink data channel is the Physical Uplink Shared CHannel, PUSCH, and an uplink grant indicates which PUSCH resources are available to the UE for uplink transmission of data packets.

By way of example, uplink scheduling can be performed in one or more of the following ways, regardless of whether the scheduling is done before or after lost time alignment:

allocating, on the network side, scheduling request resources/opportunities to the UE in accordance with the current estimate of the timing with which data packets are being available for uplink transmission in the UE to enable reception of scheduling requests from the UE and providing of corresponding uplink grants;

autonomously, on the network side, providing uplink grants to enable uplink transmission on the uplink data channel in accordance with the current estimate of the timing with which data packets are being available for uplink transmission in the UE;

activating, on the network side, semi-persistent scheduling to enable uplink transmission on the uplink data channel in accordance with the current estimate of the timing with which data packets are being available for uplink transmission in the UE.

Figure 3:
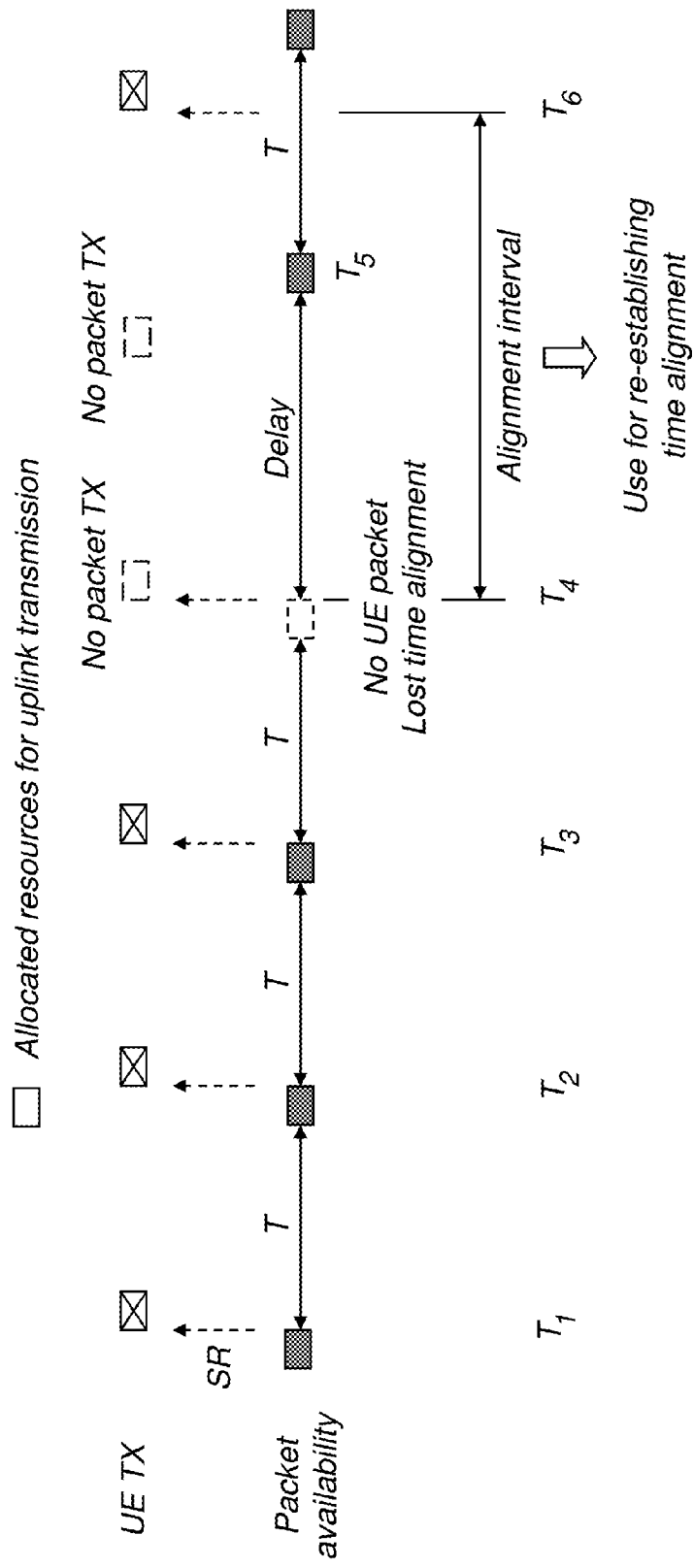
FIG. 3 is a schematic diagram illustrating an example of a scenario where the initial time alignment of packet availability and allocated resources for uplink transmission is lost due to an unexpected data packet delay.

FIG. 3 is a schematic diagram illustrating an example of a scenario where the initial time alignment of packet availability and allocated resources for uplink transmission is lost due to an unexpected data packet delay. It should be understood that FIG. 3 is merely a non-limiting example that may be useful for illustrating the principles of the proposed technology.

In this example, the packet availability in the UE and the allocated resources for uplink transmission are in time alignment at time instances $T_1$ to $T_3$, assuming that data packets are normally generated periodically and available for uplink transmission with a given periodicity T unless subjected to unexpected delay The use of scheduling requests (SRs) is optional, as indicated by the dashed arrows in FIG. 3. If scheduling requests are employed as part of the overall scheduling solution, it may be desirable for the network to allocate SR resources/opportunities to the UE in accordance with the current estimate of the timing with which data packets are being available for uplink transmission in the UE. In this way, the UE may transmit a SR to the network as and when it has a data packet available for uplink transmission on the uplink data channel. The network receives and processes the SR, which may take a short period of time, and then transmits an uplink grant to the UE, allowing the UE to perform uplink transmission using the uplink transmission resources as defined by the uplink grant. Depending on the type of wireless communication system and the technical configuration and settings of the system, there may be a certain delay between the transmission of the uplink grant and the instance, or sub-frame, in which the granted uplink transmission resources are valid. As an example, for LTE Frequency Division Duplex (FDD), an uplink grant transmitted in sub-frame N is valid for uplink transmission in sub-frame $N_+4$, i.e. with a relative delay of 4 ms with a Transmission Time Interval (TTI) of 1 ms. For LTE Time Division Duplex (TDD), the delay may be in the interval of 4-8 ms, depending on the configuration and processing delays. For other systems, the relative delay may be different.

If scheduling requests (SR) are not employed, and the network more or less autonomously provides uplink grants, the network side can use the current estimate of the timing with which data packets are being available for uplink transmission in the UE to transmit uplink grants a certain period of time in advance of the actual availability of the data packets to provide a relatively precise synchronization of the UE data packet availability and the allocated resources for uplink transmission on the uplink data channel, as illustrated in FIG. 3.

If there is an unexpected delay, which is normally substantially larger than the relative delay discussed above, in the packet generation in the UE so that there is no packet available with the expected periodicity at time $T_4$, the time alignment of the UE data packet availability and the allocated resources for uplink transmission will be lost. It may be the case that the UE receives an autonomously allocated uplink grant from the UE, but since the UE buffer is empty the UE will not be able to transmit any ordinary data packet on the uplink data channel. It may also be the case that the network has allocated a scheduling request opportunity to the UE around time $T_4$, but the UE will not use this SR opportunity to send a scheduling request since the UE buffer is empty. In either case, the time alignment is lost.

If the UE now responds by transmitting a predefined response on the uplink data channel that differs from the expected periodically generated data packets, the network can detect lost alignment based on reception of this predefined UE response. For example, the network may detect lost time alignment of UE data packet availability and allocated resources for uplink transmission by detecting an unrequested channel state report or a predetermined bit pattern in the allocated resource for uplink transmission on the uplink data channel.

In order to enable re-establishment of the time alignment, the network determines an updated estimate of the timing with which data packets are being available for uplink transmission in the UE based on information representative of an alignment interval within which data packets are being available for uplink transmission in the UE after detection of lost time alignment.

Meanwhile, the network may continue transmitting autonomously allocated uplink grants, and/or await the next scheduling request from the UE.

In a particular example, the alignment interval is initially defined by first time information representative of the timing of a most recent unused uplink resource, and second time information representative of the timing of a first used uplink resource after detection of lost time alignment.

As an example, the first time information is representative of the timing of a most recent unused scheduling request or most recent unused allocated resource for uplink transmission on the uplink data channel, and the second time information is representative of the timing of a first used scheduling request or first used allocated resource for uplink transmission on the uplink data channel after detection of lost time alignment.

With reference to FIG. 3, the alignment interval may be defined as the interval between time $T_4$ and time $T_6$. Time $T_4$ represents the timing of the most recent unused SR or most recent unused allocated uplink transmission resource on the uplink data channel. Time $T_6$ represents the timing of the first used SR or first used allocated uplink transmission resource on the uplink data channel. The network now at least knows that the next data packet was available in the UE buffer within this interval, and may use this information to determine an updated estimate of the timing with which data packets are being available for uplink transmission in the UE.

In order to improve the estimate it is possible to narrow down the alignment interval over time. This may be performed in several different ways, e.g. based on the general principles set forth in reference [2].

According to the proposed technology, it is useful to determine the estimate in an iterative search procedure over a number of iterations, wherein the alignment interval corresponds to an adaptive search interval that is continuously narrowed down each iteration until an appropriate scheduling instant is found. Preferably, each iteration corresponds to a period within which a data packet is assumed to be generated. Once the appropriate scheduling instant is found, corresponding to a time instant when a data packet is generated and available, the given periodicity can then be used to estimate the timing of the subsequent data packets.

In general, the step S10 of estimating the timing with which data packets are being available for uplink transmission and the step S40 of determining an updated estimate of the timing with which data packets are being available for uplink transmission are performed based on the given periodicity, regardless of whether the given periodicity is defined/known beforehand, or estimated during the process, as will be exemplified later on.

Figure 4:
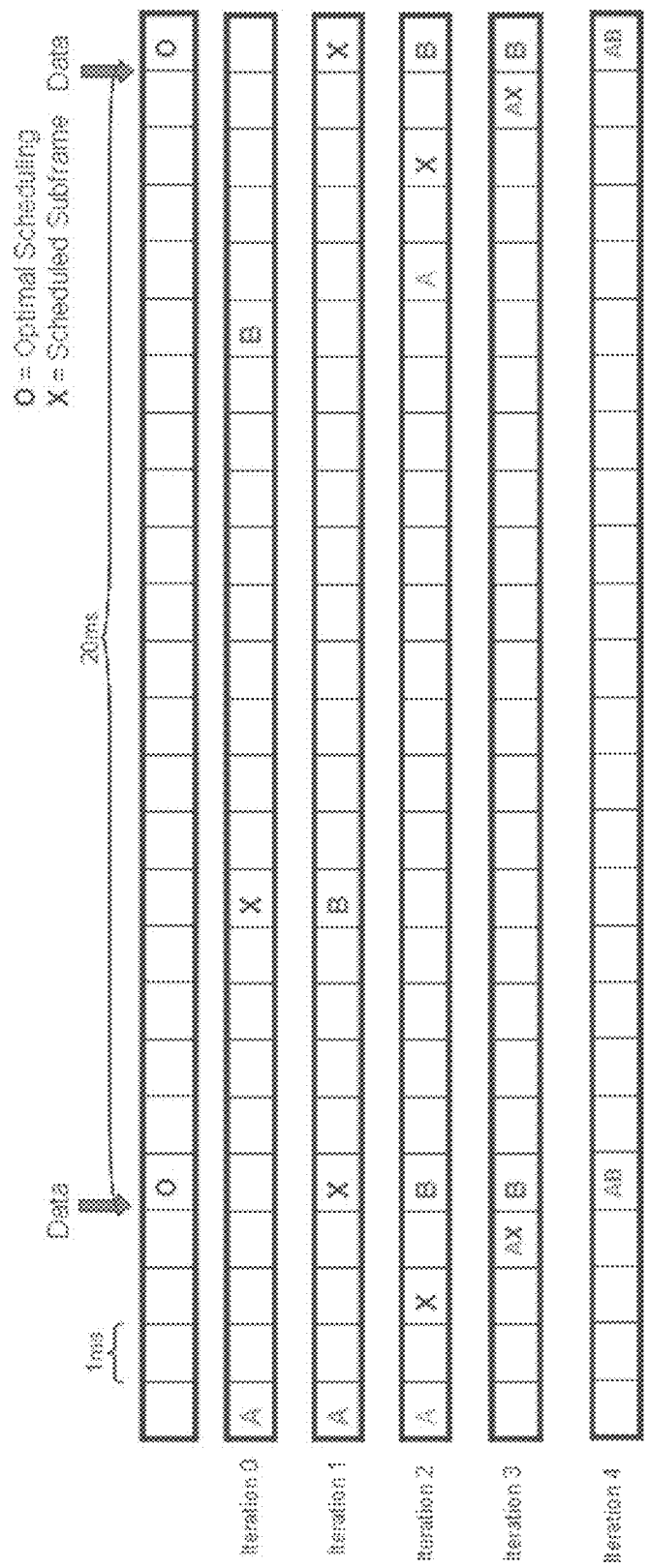
FIG. 4 is a schematic diagram illustrating an example of the iterations of an exemplary bi-section method used for determining a scheduling instance.

FIG. 4 is a schematic diagram illustrating an example of the iterations of an exemplary bi-section method used for determining a scheduling instance.

In this example, the algorithm uses the bi-section method. SPS could be considered also during this process, but will have the drawback of requiring much RRC reconfiguration. Hence, in this particular example it is assumed that the network simply provides the uplink grants explicitly for each attempt.

In the basic bi-section method, the alignment interval [A,B], which is also referred to as the synchronization interval, is defined as the interval in which the network assumes the periodic data can be sent by the UE. This interval is repeated with the assumed periodicity of the data, T. Hence, the synchronization interval [A,B] refers to the TTIs [A+$k_i$, B+$k_i$], i=0, ..., N, where N is a large positive integer and $k_{i+1}-k_i=T$.

In the example of FIG. 4, a VoIP application is considered with a 20 ms speech framing interval/periodicity. Other applications having a periodic behavior could of course be considered. It is anyway assumed that the periodicity T is known. This implies that the data generation will normally occur at the same position in the synchronization interval for all iterations i.

In the table below, an example of a suitable pseudo code is shown.

| PSEUDO CODE |
|---|
| A=A_initial=0;<br>B=B_initial=19;<br>Tolerance = 0;<br>MaxIter = Inf;<br>iter=0;<br>while (B-A>Tolerance && iter<MazIter) {<br>  -> X := floor((A+B)/2);<br>  -> Schedule PUSCH at X;<br>  -> If (X is used for PUSCH) {<br>    B := X;<br>  } else {<br>    A := X+1;<br>  }<br>  iter++;<br>} |

It can be shown that the "tolerance" in the proposed method, i.e. the difference between the optimal scheduling, O, and the midpoint interval for iteration i, $X_i$, can be upper bounded by the following expression:

$$\text{Tolerance} = |X_i - O| \leq \frac{|B_{initial} - A_{initial}|}{2^n} - 1,$$

where n is the number of iterations and $A_{initial}$ and $B_{initial}$ are the starting values of A and B respectively.

Solving for n and also taking the integer part $\lceil \cdot \rceil$ gives:

$$n \leq \left\lceil \log_2\left(\frac{|B_{initial} - A_{initial}|}{\text{Tolerance}+1}\right) \right\rceil$$

For the illustrated example in FIG. 4, this will with $B_{initial}=19$, $A_{initial}=0$ and Tolerance=0 give:

$$n \leq \lceil \log_2(19) \rceil = \lceil 4.32 \ldots \rceil = 5_5$$

Hence, in this particular example, at most 5 iterations are needed to reach a scheduling instant X, which is the same as the optimal scheduling subframe O, as shown in FIG. 4.

Note that here the interval is split into two halves for each successive iteration. The method is however easily generalized to letting the interval be split into P>2 intervals for each iteration. In such case the corresponding expression for the needed number of iterations would yield:

$$n \leq \left\lceil \log_P\left(\frac{|B_{initial} - A_{initial}|}{\text{Tolerance}+1}\right) \right\rceil$$

Further also note that one could consider even other ways of splitting the interval by e.g. non-uniform splitting of the intervals and so forth.

In either case, after the algorithm has converged, and thus the alignment or synchronization of the packet generation in the UE is known to the network, the network could:
- activate SPS with the given periodicity aligned/synchronized accordingly;
- use dynamic scheduling but disallowing SRs to be sent by the UE (or rather for the considered bearers) and instead provide uplink grants autonomously; and/or
- use dynamic scheduling while allowing SRs in order to detect and be able to quickly re-establishing alignment/synchronization.

At lost time alignment, the network can for example continue transmitting uplink grants or await the next SR from the UE, as previously mentioned.

If the network sends grants then denote the sub-frame for the last unused SR resource or unused scheduling time from a grant resource depending on what happened last by t and the sub-frame for the first used scheduling time from a grant or first used SR resource depending on what happened first by B. The alignment or synchronization interval may then be defined as [A,B], where A=t+1.

If the network does not send grants then denote the sub-frame for the last unused SR resource by t and the sub-frame for the first used SR resource by B. The alignment or synchronization interval may then be defined as [A,B], where A=t+1.

It is possible to use any SR resource that occurs in the interval [A,B] as described in the following pseudo-code:

| PSEUDO CODE |
|---|
| A : left interval point.<br>B : right interval point<br>  -> X : position for SR resource A<X<B<br>  -> If (used SR at X ) {<br>    B := X;<br>  } else {<br>    A := X+1;<br>  }<br>} |

As already indicated in the examples above, the data packets are in general assumed to be generated periodically, typically at a given framing interval defined by the communication service requested by the UE.

If the periodicity of the data packets is not known beforehand, the periodicity has to be estimated. In other words, it has been assumed above that the periodicity of the generated data is known and that only the alignment/synchronization of the scheduling instants needs to be adjusted. However, if the periodicity is initially unknown, a possibility would be to adjust the scheduling interval according to a heuristic procedure to estimate the data periodicity T.

Figure 5A:
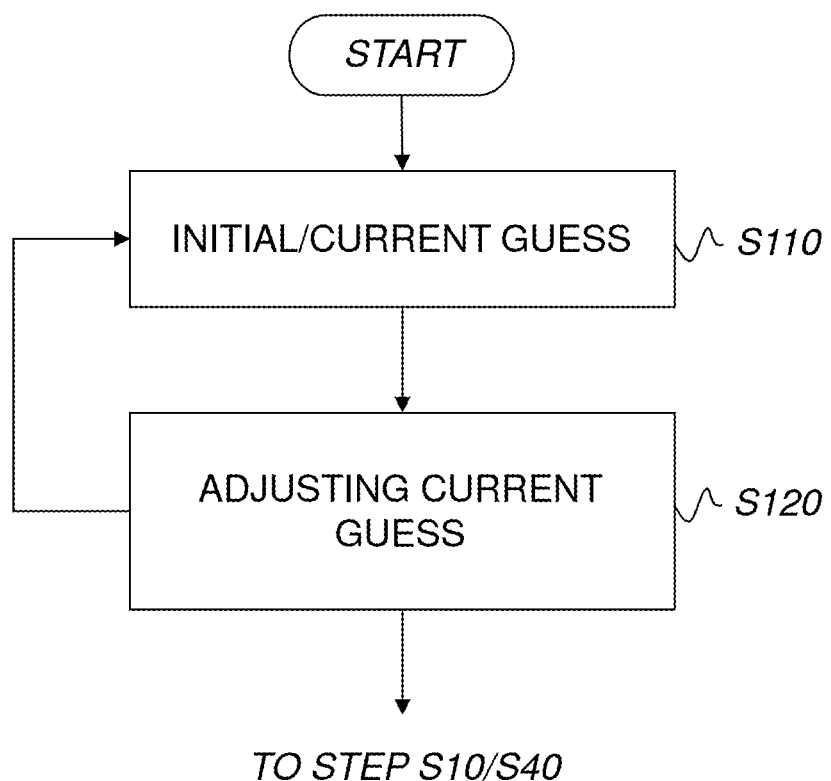
FIG. 5A is a schematic flow diagram illustrating an example of a procedure for estimating the data periodicity that can be used with the proposed technology.
Figure 5B:
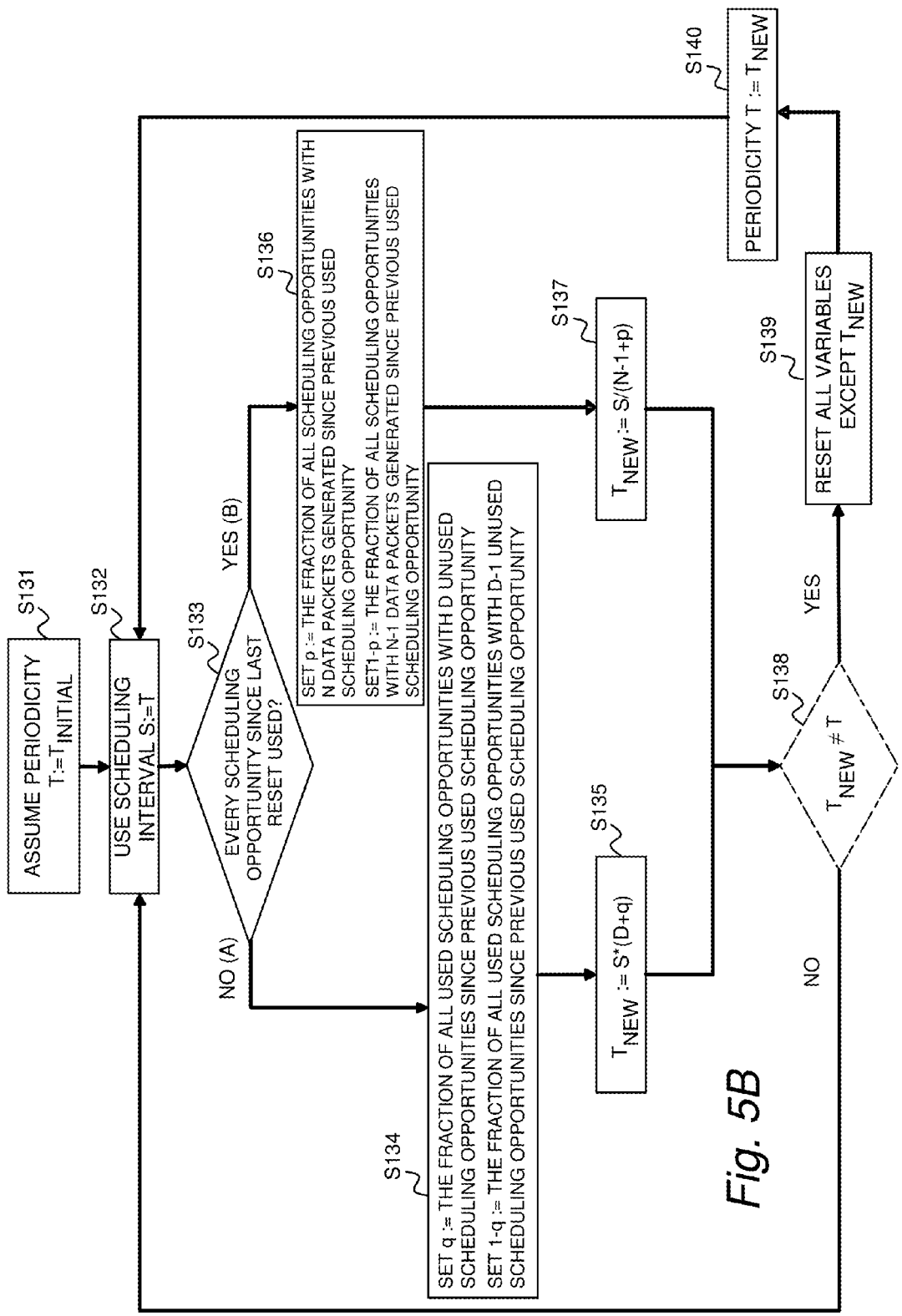
FIG. 5B is a schematic flow diagram illustrating another example of a procedure for estimating the data periodicity that can be used with the proposed technology.

FIGS. 5A and 5B are schematic flow diagrams illustrating examples of a procedure for estimating the data periodicity that can be used with the proposed technology.

Figure 6:
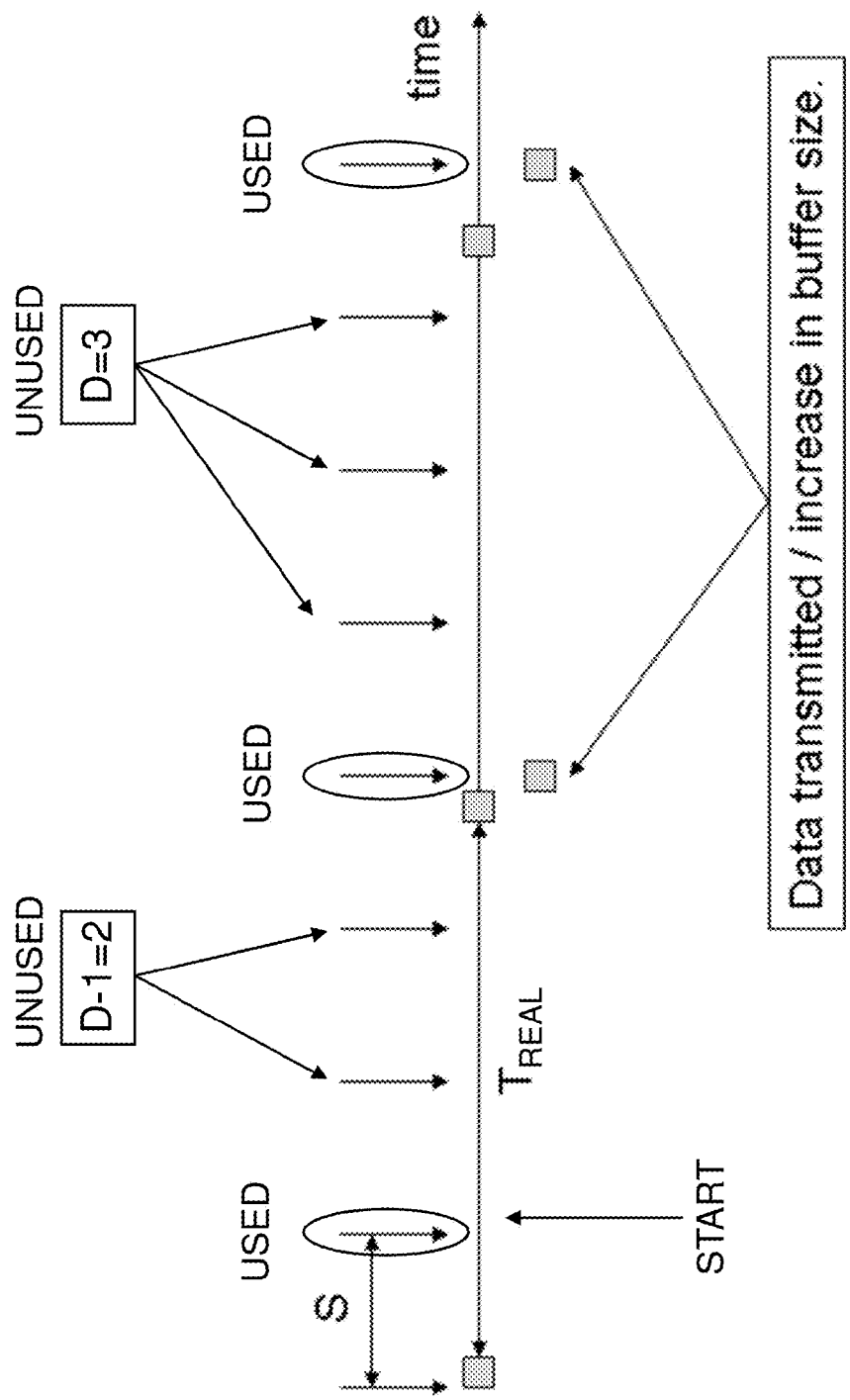
FIG. 6 is a schematic diagram illustrating an example of a situation when the current estimate of the data periodicity is too short, i.e. every scheduling opportunity is not used.
Figure 7:
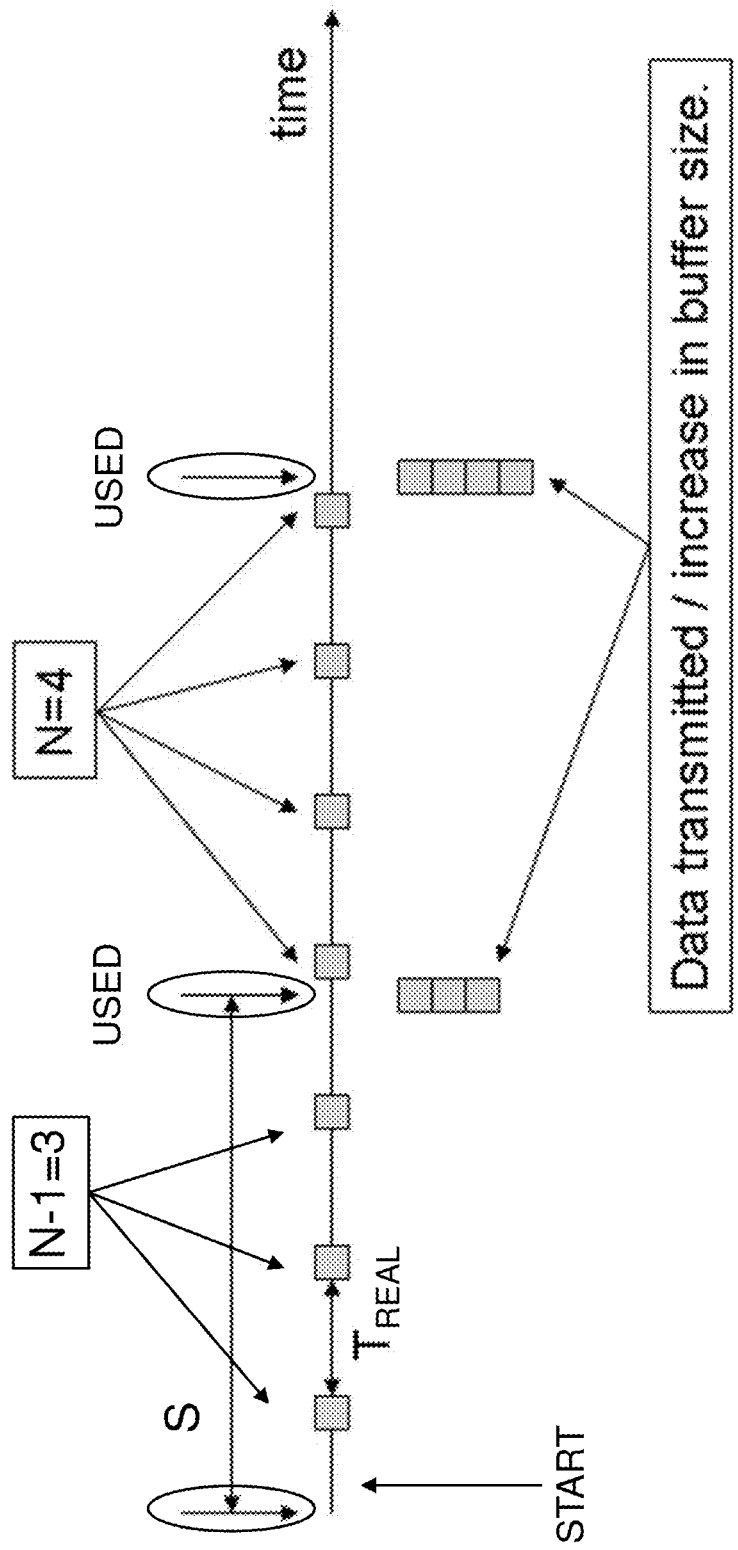
FIG. 7 is a schematic diagram illustrating an example of a situation when the current estimate of the data periodicity is too long, i.e. every scheduling opportunity is used.

According to these example procedures, an initial guess of what the periodicity T of the data is should be provided. Thereafter, regardless if this guess is too short (as illustrated in FIG. 6) or too long (as illustrated in FIG. 7) the procedure as per FIG. 5A or FIG. 5B will iteratively adjust the current estimate of the periodicity accordingly.

With reference to FIG. 5A, it can be seen that step S110 involves providing a current guess of the periodicity. In step S120, the current guess is adjusted depending on whether every scheduling opportunity, including the transmission resources, allocated based on the current guess is used. If desired or otherwise deemed appropriate, the procedure may be iterative by repeating the step 120 of adjusting the current guess. At the start, the current guess will be the initial guess of the periodicity, and the current guess will then be adjusted in each iteration of the procedure. In this way, an appropriate estimate of the periodicity can be obtained.

The estimated periodicity may then be transferred to step S10 and/or step S40 of FIG. 2. In this way, step S10 of estimating the timing with which data packets are being available for uplink transmission and step S40 of determining an updated estimate of the timing with which data packets are being available for uplink transmission may be performed based on the estimated periodicity.

By way of example, when every scheduling opportunity allocated based on the current guess is not used, the adjustment of the current guess includes determining an adjusted value of the periodicity by:

grouping, over a given period of time, the used scheduling opportunities into a first group of those used scheduling opportunities with a given number D preceding unused scheduling opportunities since previous used scheduling opportunity and a second group of those used scheduling opportunities with D−1 preceding unused scheduling opportunities since previous used scheduling opportunity, and determining the adjusted value of the periodicity based on the fraction of scheduling opportunities belonging to a selected one of the groups and the number D of preceding unused scheduling opportunities.

FIG. 6 is a schematic diagram illustrating an example of a situation when the current estimate of the data periodicity is too short, i.e. every scheduling opportunity is not used.

S denotes the currently used scheduling interval, which is set to the current estimate of the data periodicity T. However, in the example of FIG. 6, the current estimate of the data periodicity is shorter than the real period $T_{REAL}$ with which the data packets are generated. The scheduling opportunities will only be used if there are data packets available for transmission. In other words, $S<T_{REAL}$, as can be seen in FIG. 6. This means that there will be a number of unused scheduling opportunities in-between the used scheduling opportunities.

The number of unused scheduling opportunities in-between the used scheduling opportunities will vary between two contiguous values, D and D−1. The actual values of D and D−1 will vary depending on the particular value of S. In the example of FIG. 6, D=3 and D−1=2.

It can be seen that after the START of the procedure for estimating the periodicity, there will first be D−1=2 unused scheduling opportunities before the next used scheduling opportunity. At this point in time, there is 1 used scheduling opportunity with D−1 preceding unused scheduling opportunities since previous used scheduling opportunity. Subsequently, there will be D=3 unused scheduling opportunities before the next used scheduling opportunity. Now, there is also 1 used scheduling opportunity with D preceding unused scheduling opportunities since previous used scheduling opportunity. In this way, the number of preceding unused scheduling opportunities since the previous used scheduling opportunity is counted for each of the used scheduling opportunities, and the used scheduling opportunities are sorted into two groups over a given period of time, one group for D and another group for D−1. An example of how this could look like is shown in the table below:

| Fraction for group D−1 | | Fraction for group D | |
|---|---|---|---|
| Number of occurrences | Percentage | Number of occurrences | Percentage |
| 1 | 100% (1) | 0 | 0% (0) |
| 1 | 50% (0.5) | 1 | 50% (0.5) |
| 2 | 66% (0.66) | 1 | 33% (0.33) |
| 3 | 75% (0.75) | 1 | 25% (0.25) |

The table shows the fraction of scheduling opportunities belonging to each group. The fraction of the D group can be denoted q, and then the fraction of the D−1 group will by definition be 1−q when the fraction is expressed as a real value between 0 and 1, where 1 corresponds to 100%. The adjusted estimate $T_{NEW}$ of the data periodicity is then preferably determined as a function of the fraction q of scheduling opportunities belonging to a selected one of the groups and the number D. Since the fractions of the two groups are complementary, they can always be mathematically interrelated to each other.

$$T_{NEW}=f(S,D,q),$$

where f is a suitable function and S is the currently used scheduling interval, which corresponds to the current estimate of the data periodicity.

When every scheduling opportunity allocated based on the current guess is used, the adjustment of the current guess includes determining an adjusted value of the periodicity by:

grouping, over a given period of time, the used scheduling opportunities into a first group of those scheduling opportunities with a given number N data packets generated since the previous used scheduling opportunity and a second group of those scheduling opportunities with N−1 data packets generated since the previous used scheduling opportunity, and determining the adjusted value of the periodicity based on the fraction of scheduling opportunities belonging to a selected one of the groups and the number N of data packets.

FIG. 7 is a schematic diagram illustrating an example of a situation when the current estimate of the data periodicity is too long, i.e. every scheduling opportunity is used.

In the example of FIG. 7, the current estimate of the data periodicity is longer than the real period $T_{REAL}$ with which the data packets are generated. In other words, $S>T_{REAL}$, as can be seen in FIG. 7. This means that there will be a number of accumulated data packets available for transmission at each scheduling opportunity. The number of data packets generated since the previous used scheduling opportunity can be determined from the number of data packets received on the network side, optionally together with buffer status information in the received buffer status reports if all available data packets can not be transmitted at a single scheduling opportunity.

The number of data packets generated since the previous used scheduling opportunity will vary between two contiguous values, N and N−1. The actual values of N and N−1 will vary depending on the particular value of S. In the example of FIG. 7, N=4 and N−1=3.

It can be seen that after the START of the procedure for estimating the periodicity, there will first be N−1=3 periodically generated data packets at the upcoming scheduling opportunity. At this point in time, there is 1 scheduling opportunity with N−1 data packets generated since the previous used scheduling opportunity. Subsequently, there will be N=4 periodically generated data packets at the next scheduling opportunity. Now, there is also 1 scheduling opportunity with N data packets generated since the previous used scheduling opportunity. In this way, the number of data packets generated since the previous used scheduling opportunity is counted for each of the scheduling opportunities, and the scheduling opportunities are sorted into two groups over a given period of time, one group for N and another group for N−1.

An example of how this could look like is shown in the table below:

| Fraction for group N-1 | | Fraction for group N | |
|---|---|---|---|
| Number of occurrences | Percentage | Number of occurrences | Percentage |
| 1 | 100% (1) | 0 | 0% (0) |
| 1 | 50% (0.5) | 1 | 50% (0.5) |
| 1 | 33% (0.33) | 2 | 66% (0.66) |
| 2 | 50% (0.5) | 2 | 50% (0.5) |

The table shows the fraction of scheduling opportunities belonging to each group. The fraction of the N group can be denoted p, and then the fraction of the N-1 group will by definition be 1-p when the fraction is expressed as a real value between 0 and 1, where 1 corresponds to 100%. The adjusted estimate $T_{NEW}$ of the data periodicity is then preferably determined as a function of the fraction p of scheduling opportunities belonging to a selected one of the groups and the number N. Since the fractions of the two groups are complementary, they can always be mathematically interrelated to each other.

$$T_{NEW}=f(S,N,p),$$

where f is a suitable function and S is the currently used scheduling interval, which corresponds to the current estimate of the data periodicity.

For completeness, the flow diagram of FIG. 5 will now be described briefly.

In step S131, an initial guess $T_{INITIAL}$ of the periodicity is provided.

In step S132, the scheduling interval S is set to the current estimate of the data periodicity. At the start, the current estimate of the periodicity is equal to the initial guess.

In step S133, it is investigated whether every scheduling opportunity allocated based on the current guess is used, i.e. whether the current estimate of the data periodicity is too long or too short.

When every scheduling opportunity allocated based on the current guess is not used (NO) the procedure continues with steps S134 and S135, corresponding to the case described above in connection with FIG. 6. In the particular example of FIG. 5, the adjusted value of the periodicity is determined based on the fraction of scheduling opportunities belonging to a selected one of the groups and the number D of preceding unused scheduling opportunities in the following way:

$$T_{NEW}=S*(D+q),$$

as illustrated in step S135.

When every scheduling opportunity allocated based on the current guess is used (YES) the procedure continues with steps S136 and S137, corresponding to the case described above in connection with FIG. 7. In the particular example of FIG. 5, the adjusted value of the periodicity is determined based on the fraction of scheduling opportunities belonging to a selected one of the groups and the number N of generated data packets in the following way:

$$T_{NEW}=S/(N-1+p),$$

as illustrated in step S137.

In the optional step S138 it is checked whether the estimate of the periodicity has changed. If has (YES) all variables except $T_{NEW}$ is reset in step S139 and the current estimate T of the periodicity is updated to the adjusted value $T_{NEW}$ in step S140. Subsequently, the procedure continues at step S132, where the scheduling interval S is adjusted accordingly.

In general, the overall method for scheduling uplink transmission is performed by a network node on the network side. This network node could for example be a base station, network controller or a scheduling node.

Figure 8:
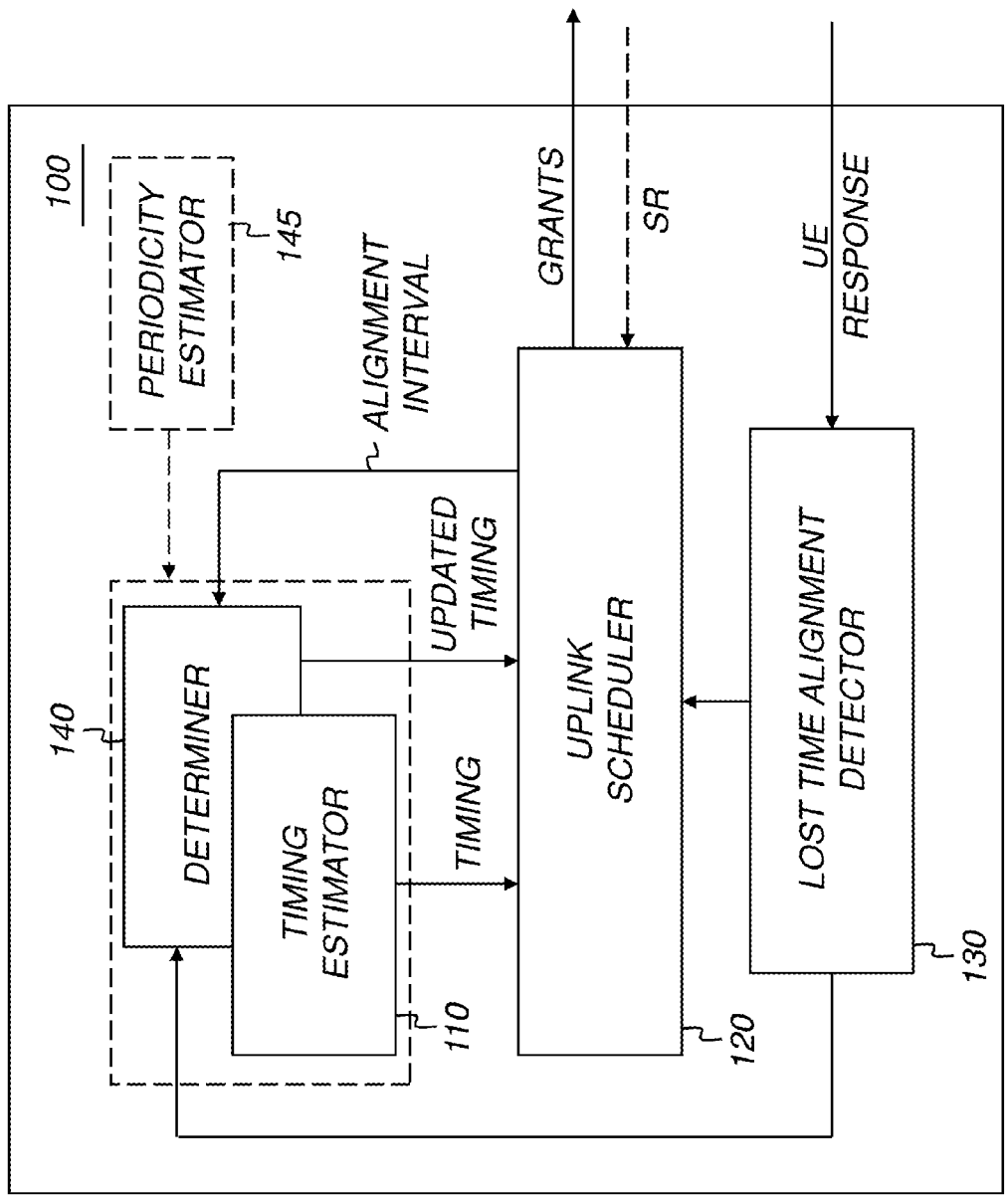
FIG. 8 is a schematic diagram illustrating an example of a device for scheduling uplink transmission of data packets according to an embodiment.

FIG. 8 is a schematic diagram illustrating an example of a device for scheduling uplink transmission of data packets according to an embodiment. The device 100 is adapted for scheduling uplink transmission of data packets between a user side and a network side in a wireless communication network. Basically, the device 100 comprises a timing estimator 110, an uplink scheduler 120, a lost time alignment detector 130 and a determiner 140, and an optional periodicity estimator 145.

The timing estimator 110 is configured to estimate the timing with which data packets are being available for uplink transmission in a User Equipment, UE, on the user side. The data packets are assumed to be generated periodically and available for uplink transmission with a given periodicity unless subjected to unexpected delay. The uplink scheduler 120 is configured to perform uplink scheduling in accordance with the estimated timing to provide time alignment of UE data packet availability and allocated resources for uplink transmission. The detector 130 is configured to detect lost time alignment of UE data packet availability and allocated resources for uplink transmission based on reception of a predefined UE response on the uplink data channel that differs from the expected periodically generated data packets. The determiner 140 is configured to determine, in response to lost time alignment, an updated estimate of the timing with which data packets are being available for uplink transmission in the UE based on information representative of an alignment interval within which data packets are being available for uplink transmission in the UE after detection of lost time alignment. The uplink scheduler 120 is further configured to perform uplink scheduling in accordance with the updated estimate of the timing with which data packets are being available for uplink transmission in the UE to re-establish time alignment of UE data packet availability and allocated resources for uplink transmission.

The timing estimator 110 and the determiner 140 may optionally be integrated into a common timing estimation unit, as schematically indicated by the dashed lines in FIG. 8.

Preferably, the determiner 140 may be configured to operate based on an alignment interval that is initially defined by first time information representative of the timing of a most recent unused uplink resource, and second time information representative of the timing of a first used uplink resource after detection of lost time alignment.

For example, the first time information may be representative of the timing of a most recent unused scheduling request or most recent unused allocated resource for uplink transmission on the uplink data channel, and the second time information may be representative of the timing of a first used scheduling request or first used allocated resource for uplink transmission on the uplink data channel after detection of lost time alignment.

In a particular example, the determiner 140 is configured to implement an iterative search procedure operating over a number of iterations, where the alignment interval corresponds to an adaptive search interval that is continuously narrowed down each iteration until an appropriate scheduling instant is found. Typically, each iteration of the iterative search procedure implemented in the determiner 140 corresponds to a period within which a data packet is assumed to be generated.

The device 100 may for example be configured to operate based on knowledge of a given framing interval, at which the data packets are assumed to be generated periodically, as defined by the communication service requested by the UE.

If the periodicity is not defined beforehand, the optional periodicity estimator 145 may be operated to provide an estimate of the data periodicity, e.g. based on the procedure(s) described in connection with FIGS. 5-7. The estimated data periodicity is then transferred from the periodicity estimator 145 for use by the timing estimator 110 and/or determiner 140. In other words, the periodicity estimator 145 is generally configured to estimate the periodicity by providing a current guess of the periodicity and then adjusting the current guess depending on whether every scheduling opportunity allocated based on the current guess is used. The timing estimator 110 and the determiner 140 are then preferably configured to operate based on the estimated periodicity.

By way of example, the uplink scheduler 120 is configured to operate, before and/or after lost time alignment, based on at least one of the following scheduling procedures:

allocating, on the network side, scheduling request resources to the UE in accordance with the current estimate of the timing with which data packets are being available for uplink transmission in the UE to enable reception of scheduling requests from the UE and providing of corresponding uplink grants;

autonomously, on the network side, providing uplink grants to enable uplink transmission on the uplink data channel in accordance with the current estimate of the timing with which data packets are being available for uplink transmission in the UE;

activating, on the network side, semi-persistent scheduling to enable uplink transmission on the uplink data channel in accordance with the current estimate of the timing with which data packets are being available for uplink transmission in the UE.

In a particular example, the detector 130 is configured to detect lost time alignment of UE data packet availability and allocated resources for uplink transmission based on detecting an unrequested channel state report or a predetermined bit pattern in the allocated resource for uplink transmission on the uplink data channel.

Figure 9:
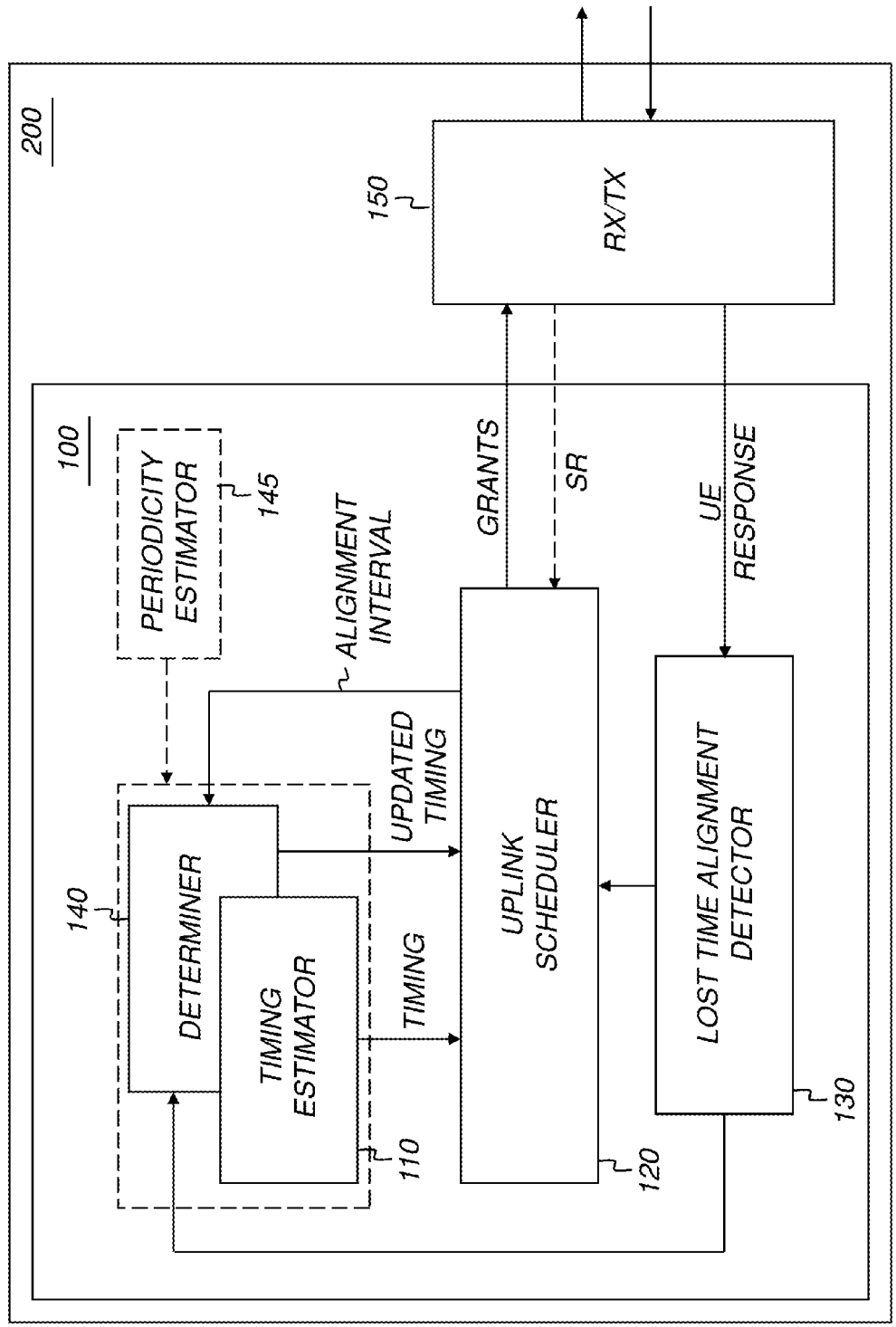
FIG. 9 is a schematic diagram illustrating an example of a network node comprising a scheduling device of FIG. 8.

FIG. 9 is a schematic diagram illustrating an example of a network node comprising a scheduling device of FIG. 8. The network node 200 basically comprises a scheduling device 100, as described above. The network node 200 may also include additional network and/or processing circuitry such as a conventional transceiver (RX/TX) 150 for enabling communication with other network units. By way of example, the network node 200 may be a base station, a network controller or a scheduling node.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits.

Many aspects of the proposed technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented, such as a base station, network controller or scheduling node. It may also be possible to re-use existing software, e.g. by reprogramming of the existing software or by adding new software components.

In the following, an example of a computer-implementation will be described with reference to FIG. 10.

Figure 10:
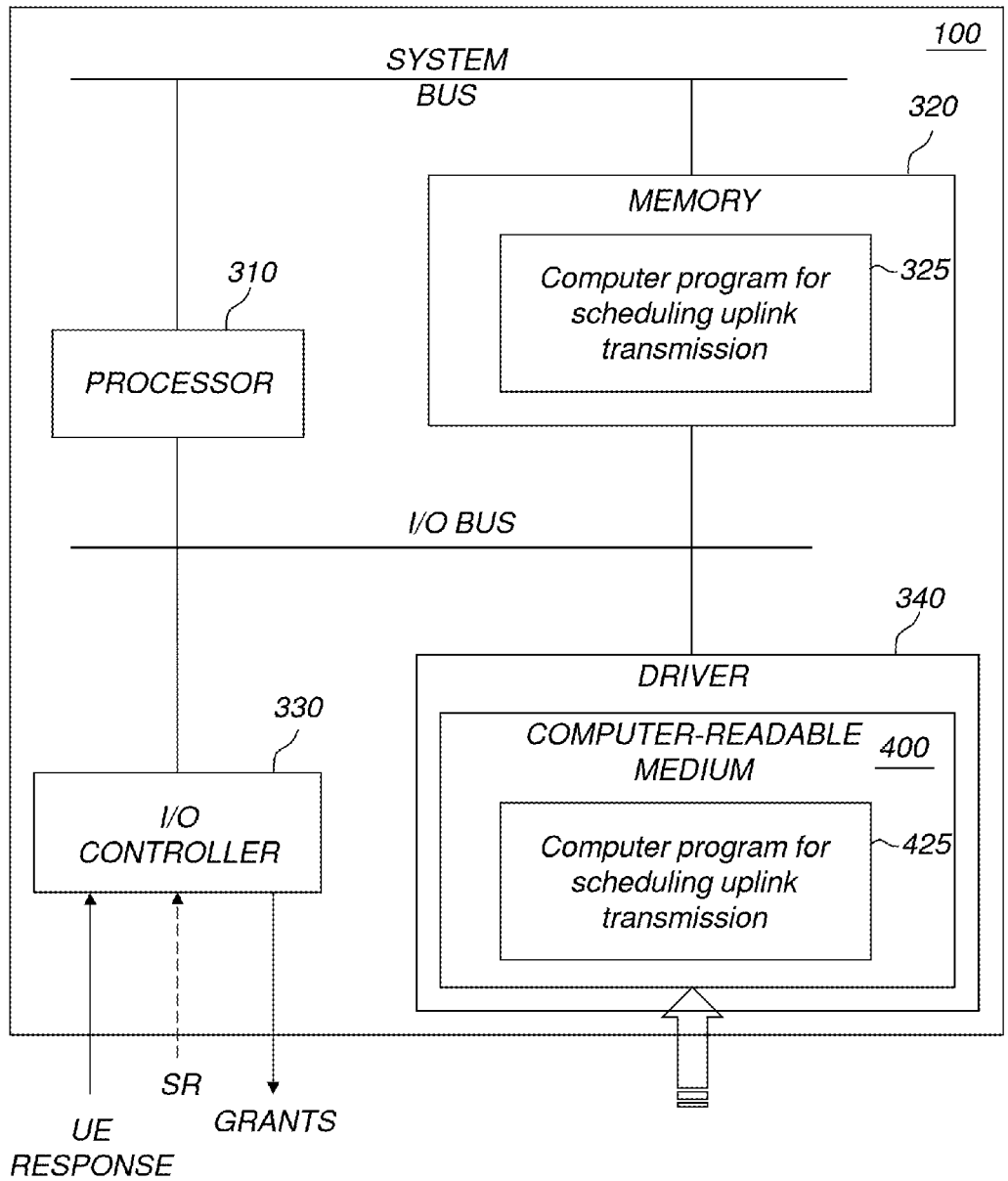
FIG. 10 is a schematic diagram of a computer implementation of a device for scheduling uplink transmission of data packets including a computer program for execution by a suitable processor.

FIG. 10 is a schematic diagram of a computer implementation of a device for scheduling uplink transmission of data packets including a computer program for execution by a suitable processor. The scheduling device 100 of this embodiment is based on a processor 310 such as a micro processor or digital signal processor, a memory 320, an input/output (I/O) controller 330 and an optional driver 340 for a computer-readable medium 400.

In this particular example, at least some of the steps, functions and/or blocks described above are implemented in software, which is loaded into memory 320 for execution by the processor 310. The processor 310 and the memory 320 are interconnected to each other via a system bus to enable normal software execution. The I/O controller 330 may be interconnected to the processor 310 and/or memory 320 via an I/O bus to enable input and/or output of relevant data such as input parameter(s) and/or resulting output parameter(s).

In this particular example, the memory 320 includes a computer program 325 for implementing the functionality of the embodiments described above including steps, functions, procedures and/or blocks. In particular, the computer program 325 includes software for scheduling uplink transmission.

More particularly, the I/O controller 330 may receive scheduling requests (SR) and UE responses that can be transferred to the processor 310 and/or memory 320 for use as input during execution of the computer program 325 to perform the proposed scheduling of uplink transmission. The corresponding grants may be transferred as output via the I/O controller 330.

Moreover, the present technology can additionally be considered to be embodied within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. The software, here exemplified in the form of computer program 425, may then be realized as a computer program product, which is normally carried on a non-transitory computer-readable medium 400, for example a CD, DVD, USB memory, hard drive or any other conventional memory device. The software may thus be loaded into the memory 320 of the device 100 or equivalent computer or processing system for execution by the processor 310.

The computer/processor/controller does not have to be dedicated to execute only the above-described steps, functions, procedure and/or blocks, but may also execute other software tasks.

The embodiments described above are merely given as examples, and it should be understood that the proposed technology is not limited thereto. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] WO 2011/025426
[2] WO 2010/090566

The invention claimed is:

1. A method for scheduling uplink transmission of data packets between a user side and a network side in a wireless communication network, the method comprising:
    estimating, on the network side, the timing with which data packets are being available for uplink transmission in a User Equipment (UE) on the user side, wherein said data packets are assumed to be generated periodically and available for uplink transmission with a given periodicity unless subjected to unexpected delay;
    performing, on the network side, uplink scheduling in accordance with the estimated timing to provide time alignment of UE data packet availability and allocated resources for uplink transmission;
    detecting, on the network side, lost time alignment of UE data packet availability and allocated resources for uplink transmission based on reception of a predefined UE response on the uplink data channel that differs from the expected periodically generated data packets; and
    determining, on the network side and in response to lost time alignment, an updated estimate of the timing with which data packets are being available for uplink transmission in the UE based on information representative of an alignment interval within which data packets are being available for uplink transmission in the UE after detection of lost time alignment; and
    performing, on the network side, uplink scheduling in accordance with the updated estimate of the timing with which data packets are being available for uplink transmission in the UE to re-establish time alignment of UE data packet availability and allocated resources for uplink transmission.

2. The method of claim 1, wherein said alignment interval is initially defined by first time information representative of the timing of a most recent unused uplink resource, and second time information representative of the timing of a first used uplink resource after detection of lost time alignment.

3. The method of claim 2, wherein the first time information is representative of the timing of a most recent unused scheduling request or most recent unused allocated resource for uplink transmission on the uplink data channel, and the second time information is representative of the timing of a first used scheduling request or first used allocated resource for uplink transmission on the uplink data channel after detection of lost time alignment.

4. The method of claim 1, wherein said determining, on the network side, an updated estimate of the timing with which data packets are being available for uplink transmission in the UE is performed in an iterative search procedure over a number of iterations, wherein said alignment interval corresponds to an adaptive search interval that is continuously narrowed down each iteration until an appropriate scheduling instant is found.

5. The method of claim 4, wherein each iteration corresponds to a period within which a data packet is assumed to be generated.

6. The method of claim 1, wherein the data packets are assumed to be generated periodically at a given framing interval defined by the communication service requested by the UE.

7. The method of claim 1, wherein said periodicity is estimated by providing a current guess of the periodicity and then adjusting the current guess depending on whether every scheduling opportunity allocated based on the current guess is used, wherein said estimating the timing with which data packets are being available for uplink transmission and said determining an updated estimate of the timing with which data packets are being available for uplink transmission are performed based on the estimated periodicity.

8. The method of claim 7, wherein said adjusting the current guess includes determining, when every scheduling opportunity allocated based on the current guess is not used, an adjusted value of the periodicity by:
    grouping, over a given period of time, the used scheduling opportunities into a first group of those used scheduling opportunities with a given number D preceding unused scheduling opportunities since the previous used scheduling opportunity and a second group of those used scheduling opportunities with D−1 preceding unused scheduling opportunities since the previous used scheduling opportunity, and
    determining the adjusted value of the periodicity based on the fraction of scheduling opportunities belonging to a selected one of said groups and the number D of preceding unused scheduling opportunities.

9. The method of claim 7, wherein said adjusting the current guess includes determining, when every scheduling opportunity allocated based on the current guess is used, an adjusted value of the periodicity by:
    grouping, over a given period of time, the used scheduling opportunities into a first group of those scheduling opportunities with a given number N data packets generated since the previous used scheduling opportunity and a second group of those scheduling opportunities with N−1 data packets generated since the previous used scheduling opportunity, and
    determining the adjusted value of the periodicity based on the fraction of scheduling opportunities belonging to a selected one of said groups and the number N of data packets.

10. The method of claim 7, wherein said periodicity is estimated in an iterative procedure by repeating the adjusting of the current guess.

11. The method of claim 1, wherein said uplink scheduling before lost time alignment, or after lost time alignment, or both, comprises at least one of:
    allocating, on the network side, scheduling request resources to the UE in accordance with the current estimate of the timing with which data packets are being available for uplink transmission in the UE to enable reception of scheduling requests from the UE and providing of corresponding uplink grants;
    autonomously, on the network side, providing uplink grants to enable uplink transmission on the uplink data channel in accordance with the current estimate of the timing with which data packets are being available for uplink transmission in the UE;
    activating, on the network side, semi-persistent scheduling to enable uplink transmission on the uplink data channel in accordance with the current estimate of the timing with which data packets are being available for uplink transmission in the UE.

12. The method of claim 1, wherein said detecting, on the network side, lost time alignment of UE data packet availability and allocated resources for uplink transmission includes detecting an unrequested channel state report or a predetermined bit pattern in the allocated resource for uplink transmission on the uplink data channel.

13. The method of claim 1, wherein said uplink data channel is a Physical Uplink Shared CHannel, PUSCH, and an uplink grant indicates which PUSCH resources are available to the UE for uplink transmission of data packets.

14. The method of claim 1, wherein said method is performed by a network node on the network side.

15. The method of claim 14, wherein said network node is a base station, network controller or a scheduling node.

16. A device for scheduling uplink transmission of data packets between a user side and a network side in a wireless communication network, said device comprising:
- a timing estimator configured to estimate the timing with which data packets are being available for uplink transmission in a User Equipment (UE) on the user side, wherein said data packets are assumed to be generated periodically and available for uplink transmission with a given periodicity unless subjected to unexpected delay;
- an uplink scheduler configured to perform uplink scheduling in accordance with the estimated timing to provide time alignment of UE data packet availability and allocated resources for uplink transmission;
- a detector configured to detect lost time alignment of UE data packet availability and allocated resources for uplink transmission based on reception of a predefined UE response on the uplink data channel that differs from the expected periodically generated data packets; and
- a determiner configured to determine, in response to lost time alignment, an updated estimate of the timing with which data packets are being available for uplink transmission in the UE based on information representative of an alignment interval within which data packets are being available for uplink transmission in the UE after detection of lost time alignment;
- wherein said uplink scheduler is configured to perform uplink scheduling in accordance with the updated estimate of the timing with which data packets are being available for uplink transmission in the UE to re-establish time alignment of UE data packet availability and allocated resources for uplink transmission.

17. The device of claim 16, wherein said determiner is configured to operate based on an alignment interval that is initially defined by first time information representative of the timing of a most recent unused uplink resource, and second time information representative of the timing of a first used uplink resource after detection of lost time alignment.

18. The device of claim 17, wherein the first time information is representative of the timing of a most recent unused scheduling request or most recent unused allocated resource for uplink transmission on the uplink data channel, and the second time information is representative of the timing of a first used scheduling request or first used allocated resource for uplink transmission on the uplink data channel after detection of lost time alignment.

19. The device of claim 16, wherein said determiner is configured to implement an iterative search procedure operating over a number of iterations, wherein said alignment interval corresponds to an adaptive search interval that is continuously narrowed down each iteration until an appropriate scheduling instant is found.

20. The device of claim 19, wherein each iteration of said iterative search procedure implemented in said determiner corresponds to a period within which a data packet is assumed to be generated.

21. The device of claim 16, wherein said device is configured to operate based on knowledge of a given framing interval at which the data packets are assumed to be generated periodically, as defined by the communication service requested by the UE.

22. The device of claim 16, wherein said device further comprises a periodicity estimator configured to estimate said periodicity by providing a current guess of the periodicity and then adjusting the current guess depending on whether every scheduling opportunity allocated based on the current guess is used, wherein said timing estimator and said determiner are configured to operate based on the estimated periodicity.

23. The device of claim 16, wherein said uplink scheduler is configured to operate, before lost time alignment or after lost time alignment, or both, based on at least one of the following scheduling procedures:
- allocating, on the network side, scheduling request resources to the UE in accordance with the current estimate of the timing with which data packets are being available for uplink transmission in the UE to enable reception of scheduling requests from the UE and providing of corresponding uplink grants;
- autonomously, on the network side, providing uplink grants to enable uplink transmission on the uplink data channel in accordance with the current estimate of the timing with which data packets are being available for uplink transmission in the UE;
- activating, on the network side, semi-persistent scheduling to enable uplink transmission on the uplink data channel in accordance with the current estimate of the timing with which data packets are being available for uplink transmission in the UE.

24. The device of claim 16, wherein said detector is configured to detect lost time alignment of UE data packet availability and allocated resources for uplink transmission based on detecting an unrequested channel state report or a predetermined bit pattern in the allocated resource for uplink transmission on the uplink data channel.

25. The device of claim 16, wherein said uplink data channel is a Physical Uplink Shared CHannel (PUSCH) and an uplink grant provided by the uplink scheduler indicates which PUSCH resources are available to the UE for uplink transmission of data packets.

26. A network node for implementation on the network side in a wireless communication network, said network node comprising the device of claim 16.

27. The network node of claim 26, wherein said network node is a base station, a network controller or a scheduling node.

* * * * *